3,663,635
HYDROGENATION PROCESS AND CATALYSTS
THEREFOR
Christian Lassau, 11 Rue Lalo, 75 Paris (XVI eme),
 France; Robert Stern, 20 Bis rue Saint Cyr, 78 Marly-
 le-Roi, France; and Lucien Sajus, 41 Avenue de
 Verdun, 78 Croissy-sur-Seine, France
No Drawing. Filed Sept. 5, 1969, Ser. No. 856,251
Claims priority, application France, Sept. 5, 1968,
 165,254; Dec. 24, 1968, 180,253; Feb. 17, 1969,
 6903966
Int. Cl. C07c 15/00
U.S. Cl. 260—666 P        2 Claims

ABSTRACT OF THE DISCLOSURE

In the hydrogenation of unsaturated compounds such as olefins, there is provided a new improved catalyst. This catalyst is made by contacting a transition metal compound with an aluminum hydride of the formula:

$$AlH_nX_{3-n} \text{ or } Me(AlH_mX'_{4-m})_p$$

wherein $n$ is 1 or 2,
$m$ is 1, 2 or 3,
Me is a metal of Group Ia or IIa of the Periodic Table,
$p$ is the valence of the metal Me,
X is OR, $NR_2$, NHR or SR,
X' is R, OR, $NR_2$, NHR or SR,
R, taken separately, is a monovalent hydrocarbon, and when taken in pairs represent —A—Z—B— wherein A and B each is alkylene, and Z is alkylene, an oxygen or sulfur atom, a NH or N-hydrocarbyl group or a polyvalent metal.

---

This invention relates to a new process for hydrogenating unsaturated compounds as well as to a process for manufacturing very active catalysts which may have many uses, for example for hydrogenating unsaturated hydrocarbons. This invention also relates to the new catalysts thus obtained.

It was already known that the catalysts of the Ziegler type have some hydrogenating properties; these properties have been used for example for limiting the length of the chains obtained during the polymerization of mono- or di-olefins.

Some prior patent claims or hydrogenation catalysts are based on this fact; they refer to a so called Ziegler catalyst obtained by contacting a transition metal compound with an aluminum reducing compound of the $AlR_3$ or $AlR_2X$ type, R being an alkyl radical and X a substituent such as a halogen atom.

The above catalysts have the following drawbacks:

(1) Although their hydrogenation velocity is higher than that of Raney nickel, it is not sufficiently attractive from an economic point of view since these soluble catalysts cannot be easily re-used.

(2) The alkylaluminum compounds as well as their derivatives are often inflammable, air-sensitive and difficult to handle.

(3) Reproducibility is only obtained with a particular Al/metal ratio.

(4) The hydrogenation reactions are often incomplete.

(5) A constant speed cannot be easily maintained since the reducing agent tends to decompose the active catalyst to colloidal metal which is a poorer hydrogenation catalyst, also requiring the use of a relatively high pressure.

This invention relates to a process for hydrogenating unsaturated compounds such as mono-olefins, di-olefins and poly-olefins, for example polymer solutions.

Another object of the invention is to provide catalysts exhibiting a high hydrogenating activity with respect to mono-olefins, di-olefins and poly-olefins, particularly the viscous solutions of polymers, these catalysts being soluble in the saturated or unsaturated hydrocarbons.

The catalysts according to the present invention comprise at least one metal compound and one reducing agent such as hereinafter defined, optionally together with an electron donor. The metal compound is a compound of a transition metal of any one of Groups I to VIII, preferably Group VIII, of the Periodic Chart.

The anionic constituent of the metal compound may be any anion, for example halogenide, alkoxide such as acetylacetonate, sulfonate, for example camphor sulfonate, carboxylate such as naphthenate, oleate, stearate, 2-ethyl hexanoate or trifluoracetate.

Among the useful cations of the metal compound, those of the following metals may be mentioned: Co, Ni, Ti, V, Cr, Mn, Fe, Cu, Zr, Mo, Ru, Rh, Pd, Ag, W, Re, Os, Ir, Pt and preferably cobalt and titanium.

By way of examples the following cobalt salts may be used: dichloride, dibromide, diiodide, di acetylacetonate, tri-acetylacetonate, naphthenate (irrespective of its cobalt content), oleate, stearate, 2-ethyl hexanoate, acetate.

The titanium compounds advantageously conform to the formula:

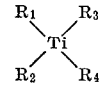

in which $R_1$, $R_2$, $R_3$ and $R_4$ are anions, for example halide, alkoxide, thio or carboxylate. A preferred structure is $TiX_2Y_2$ in which X represents halide, amino, hydrocarbylamino, thio, carboxylate, alkoxide, for example Cl, Br, I, $NR_2$, SR, OCOR, OR where R is alkyl, aryl, cycloalkyl, alkaryl, arylalkyl, either substituted or not, or a hydrogen atom, and Y is cyclopentadienyl (Cp), indenyl, fluorenyl or allyl substituted or not.

Examples follow:

$TiCl_2Cp_2$, $TiCl_2(indenyl)_2$, $Ti(OR)_2Cp_2$ $Ti(OR)_2(indenyl)_2$, $Ti(OR)ClCp_2$ $Ti(OR)Cl(indenyl)_2$, $Ti(SC_6H_5)_2Cp_2$ $Ti(NR_2)_2Cp_2$ where: $R=CH_3$, $C_2H_5$, iso—$C_4H_9$, tertiary—$C_4H_9$, n—$C_4H_9$, iso—$C_5H_{11}$, $C_7H_{15}$, $C_{18}H_{35}$, $C_6H_5$, $C_7H_8$.

Also with chromium a high activity has been obtained at 20° C., although chromium is usually considered as a poor hydrogenation catalyst. Iron may also be mentioned, for example in the form of a common compound such as iron trichloride.

The choice of the reducing agent is critical in order to obtain systems which are very active and more active than those based on conventional alkyl-aluminum reducing agents.

The reducing agents of this invention belong to two types:

(1) Those of formula $$AlH_nX_{3-n}$$

in which $n$ is 1 or 2 and the X groups (which may be identical to or different from each other when $n$ is 1) are selected from the OR, $NR_2$ NHR and SR groups wherein R is a hydrocarbon monovalent radical, either linear or cyclic, substituted or not, optionally containing heteroatoms such as oxygen, nitrogen and sulfur atoms, or even metals. R may be, for example alkyl, cycloalkyl or aryl. When $n$ is 1, the two X groups may be interconnected so as to form an —A—Z—B— group in which A and B are alkylene radicals and Z is oxygen, sulfur, an alkylene group, a NH group or a N-hydrocarbonyl group.

(2) Those of formula:

$$Me(AlH_mX'_{4-m})_p$$

in which $m$ is 1, 2 or 3, Me is a monovalent or divalent metal selected from groups I-A and II-A and $p$ is the valence degree of Me.

The X' groups, which may be identical or different, are R, OR, $NR_2$, NHR or SR groups in which R is defined as herebefore. Two X' groups may be interconnected as pointed out before with respect to X.

The reducing agents of the first type may be manufactured as follows:

(a) By reacting aluminum tri-hydride with a compound containing an "acid" hydrogen, for example an acid, alcohol, amine, thiol, sulfonic acid or phenol, for example a compound of the formula ROH, RNHR' or RSH in which R and R' may be hydrocarbon radicals, for example alkyl, cycloalkyl or aryl, substituted or not, or R' may be hydrogen. By way of examples, R and R' may be ethyl, iso-butyl, undecyl, phenyl, benzyl, cumyl, tolyl, cyclopentyl, cyclohexyl, cyclohexenyl, naphthyl or acetylacetonyl; R and R' may also contain an oxygen, sulfur, nitrogen, or metal atom.

(b) By reacting an aluminum hydride with a compound containing a ketone group or any other reducible group, for example epoxy, aldehyde, quinone, carboxylic acid, ester, lactone, amide, nitrile, oxime, isocyanate, disulfide or sulfoxide.

The compounds of the second type may be obtained as follows:

The first method is the same as that disclosed above, except that the aluminum hydride has the formula $$Me(AlH_4)_p$$

in which Me and $p$ are defined as herebefore. The following are illustrative of these hydrides: $LiAlH_4$, $NaAlH_4$ and $Ca(AlH_4)_2$.

The second method consists of reacting an hydride of a metal of Groups I-A or II-A, such as LiH, NaH or $CaH_2$ with an aluminum organic compound, such as an alkylaluminum, a dialkylaluminum hydride, a dialkylaluminum monoalkoxide, an alkylaluminum dialkoxide or an aluminum trialkoxide.

With some reducing agents, particularly those having a R substituent containing no hetero-atom such as defined hereabove, it is advantageous to contact the transition metal compound and the reducing agent only in the presence of an organic compound having either one or more ether groups, for example tetrahydrofuran, diethylene glycol dimethyl ether, ethylene glycol dimethyl ether, di-ethyl ether, diethylene glycol diethyl ether, or a tertiary amine group, for example pyridine. The activity of the resulting catalyst is substantially increased.

It has been discovered, and this is another feature of this invention, that a high catalytic activity could be obtained in the absence of such an organic compound. Thus in a hydrocarbon medium, either saturated or not, by reacting a reducing agent with a transition metal compound, very active hydrogenation catalysts can be obtained. This particular type of reducing agent has at least one R radical, such as defined hereabove, containing a hetero-atom such as oxygen or nitrogen. Such reducing agents may be obtained, in particular, from tetrahydrofurfurylic alcohol, ethylene glycol monoalkyl ethers, diethylene glycol monoalkyl ethers, hydroxy-pyridine.

However, it is also possible to introduce, into the reaction medium, the alcohol or amine, and then the reducing agent, for example $NaAlH_4$, $LiAlH_4$, $NaAlH_2$ (iso-butyl)$_2$ so as to manufacture the catalyst "in situ." This particular process, although more simple, gives somewhat lower activities than those obtained by the general process of this invention.

Preferred reducing agents are:

$LiAlH(O\text{-tert-butyl})_3$, $NaAlH(O\text{-tert-butyl})_3$, $AlH(O\text{-tert-butyl})_2$ $NaAlH(C_2H_5)_3$, $NaAlH_2(\text{iso-butyl})_2$ $NaAlH_2(O-CH_2-CH_2-CH_2)(O\text{-tert-Bu})$, $NaAlH(OCH_2CH_2OCH_3)_3$

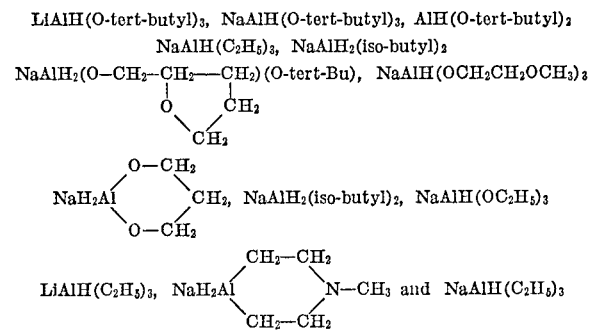

$LiAlH(C_2H_5)_3$, $NaH_2Al\begin{pmatrix}CH_2-CH_2\\CH_2-CH_2\end{pmatrix}N-CH_3$ and $NaAlH(C_2H_5)_3$ By way of specific catalysts of this invention, the following may be mentioned:

$\begin{cases}AlH(O\text{ tert.Bu})_2 \text{ and } CoBr_2[P(C_6H_{11})_3]_2 \text{ in benzene}\\ AlH(O\text{ tert.Bu})_2 \text{ and } NiCl_2[P(C_6H_{11})_3]_2 \text{ in benzene}\\ AlH(O\text{ tert.Bu})_2 \text{ and } CoBr[C\equiv P(C_6H_5)_3]_3 \text{ in benzene}\end{cases}$ $AlH(N(C_4H_5)_2)_2$ and $CoBr_2$ in benzene $LiAlH(O\text{ tert.Bu})_3$ and $FeCl_3$ in heptane $NaAlH_2(O\text{ tert.Bu})_2$ and Co naphthenate in heptane $LiAlH_2(O\text{ tert.Bu})_2$ and $VCl_2CP_2$ in benzene $AlH_2(O\text{ tert.Bu})$ and $Zn(\text{acetylacetonate})_2$ in heptane $LiAlH_2(O\text{ tert.Bu})_2$ and $Cr(\text{acetylacetonate})_3$ in heptane The molar ratio of the transition metal compound to the aluminum compound is dependent on the aluminum reducing agent. It is usually ¼ for $LiAlH(O\text{-tert.Bu})_3$ and ½ for $AlH(O\text{-tert.Bu})_2$. This ratio may be higher with salts having reducible anions other than the halogenides.

It is usually between 1/1 and 1/20. Since the compound $LiAlH(O\text{-tert.Bu})_3$ is a solid, it may be easily weighed and dissolved in a small amount of a solvent such as tetrahydrofuran and used in the stoichiometric amount of ¼. When the stoichiometric amount is not sufficient, this usually results from water or alcohol present as impurity in the solvents or the compounds to be hydrogenated, or on the wall of the reaction vessel.

It has been found that some reducing agents may be used in excess, together with some metals, without change of the speed. These usually conform to the formula $MeAlH(OR_3)$ in which R is tert. alkyl or aryl. With these reducing agents since the stoichiometric amount is not important, it is possible to go beyond the molar ratio of the reducing compound to the metal salt, which results in quite reproducible results since the excess of reducing compound eliminates any trace of water.

The manufacture of the catalytic systems may be carried out before or during the reaction. It has been possible to isolate a crystalline compound, for example in the case of titanium, cobalt and nickel, said compound containing an aluminum atom, alkoxy groups and hydrogen atoms. Its formula depends on the nature of the metal.

According to a particular embodiment, a catalytic mixture is manufactured, it is then evaporated and dissolved in a paraffin or a liquid polymer at a temperature slightly above 20° C. It is also possible to start with a polymer containing the metal which is thereafter reduced in solution. The polymer is precipitated subsequently.

When a heterogeneous catalyst must be used, such supports may be used as molecular sieves, alumina, silica or any other inorganic or organic material that may be sufficiently dried.

When $CoBr_2$ is used as the metallic salt, it is advantageous to dissolve this salt in a small amount of tetrahydrofuran and to introduce the olefin before the reducing agent. If such complexes as $CoBr_2[PO(\text{phenyl})_3]_2$, $CoBr_2(\text{pyridine})$ or $CoBr_2[P(C_6H_{11})_3]_2$ are used, the catalyst may be easily manufactured under hydrogen before use and it may be stored at about 20° C. in benzene.

It is also possible to operate in the presence of a number of compounds acting as electron-donors. There will be mentioned, by way of examples, ethers, amines, heterocyclic compounds such as pyridine or quinoline, phosphine oxides, for example triphenyl phosphine oxide, tricyclohexyl phosphine oxide, trioctyl phosphine oxide, and such phosphines as tricyclohexyl phosphine.

The "electron-donors" have several uses. For example, they are useful for dissolving the reducing compound (this is the case of cyclic ethers), and, above all, they improve the solubility of the cobalt compound. The solution grows more homogeneous.

Some compounds of this type are, however, strong inhibitors and must be avoided when high activities are desired. This is the case of ethylene-bis-diphenylphosphine, triphenylphosphine and the phosphites.

The electron-donors other than ethers are usually introduced in the form of a pre-formed complex with the transition metal salt. It is easy to manufacture complexes with cobalt bromide and the phosphine oxides, the phosphines or the amines according to known methods.

The hydrogenation conditions are usually mild; however one may operate under a pressure of 0.01 to 300 bars (1 bar=0.987 atm.) and at a temperature of −50 to 200° C., preferably 0 to 150° C. The concentration of the catalyst may be as low as 0.0001 gram-mol. of transition metal compound per 100 gram-mol. of the compound to be hydrogenated. The preferred concentrations are between 0.001 to 0.1 gram-mol. of transition metal compound per 100 gram-mol. of compound to be hydrogenated.

Such catalysts are so active that their concentration may be lowered to a very small value, which makes unnecessary the recovery of the catalyst and the removal of the catalyst residues from the reaction product. The used reducing agents are safe to handle.

The above concentrations are given for 100 gram-mol. of hydrogenizable compound, expressed as mono-olefin. With multi-olefins, and particularly with polymers of di-olefins, the proportions must be multiplied by the number of double bonds present in each molecule.

The catalyst may be used as a soluble catalyst or a heterogeneous catalyst on an inert carrier. This catalyst may be used for hydrogenating unsaturated chemical groups. There will be mentioned by way of example, the hydrogenation of mono-olefins, di-olefins, polyolefins or viscous solutions of polymers, for example solutions in hydrocarbons or polar solvents such as those mentioned herebefore.

As examples of hydrogenizable compounds, the following may be named: mono-, di- and tri-olefins having, for example, up to 20 carbon atoms per molecule, for example ethylene, allene, cyclopentene, cyclododecatriene, 1,3,5-undecatriene, 1,5-cyclooctadiene, as well as the polymers of mono- and di-olefins, for example polyisoprene, polybutadiene and the co-polymers styrene-butadiene.

A particular embodiment relates to the hydrogenation of cyclic polymers, particularly cyclododecatriene or cyclooctadiene, or hydrocarbon cuts containing a high proportion of the same.

It is well-known that one may hydrogenate cyclododecatriene by means of heterogeneous catalyst of the nickel Raney type or catalysts based on noble metals. The hydrogenation of cyclododecatriene in homogeneous phase has also been described; however the catalysts were based on such alkylaluminum compounds as $AlR_3$ or $AlR_2X$ in which X is an OEt group. The drawbacks resutling from the use of these catalysts are known: with Raney nickel, the hydrogenation of cyclododecatriene at low temperature is not complete, while, at high temperature, cyclododecane decomposes. On the other hand the separation of Raney nickel from cyclododecane (melting point: 60.6° C.) by filtration is expensive on an industrial scale and results in substantial losses of nickel. The use of noble metal catalysts has as the main drawback the cost of the catalyst and the resulting financial investment.

The homogeneous catalysts have several drawbacks for an effective industrial use. Their use is difficult since, on the one hand, it is necessary to maintain a precise stoichiometric ratio between the alkyl metal and the transition metal salt, and, on the other hand, the alkyl reducing agents are highly inflammable. The concentrations of the two catalytic constituents are such that for an economic use of the process, it is necessary to recover and recycle the catalyst which is hardly feasible; even if it were acceptable to lose the catalyst, it would be necessary to remove it from the product since, otherwise, the concentrations of metals would be too high for the main uses of cyclododecane.

The hydrogenation may be carried out batchwise or continuously and, in the latter case, with one or several reaction vessels with or without recycling of a portion of the outflow. The reaction may be worked either in a trickle column or in a column with perforated plates, or in an autoclave with an efficient device for dispersing hydrogen throughout the solution.

A solvent, inert with respect to the catalyst and the reaction, may be used, for example a saturated hydrocarbon or an ether, but the reaction is advantageously carried out without solvent. The compound to be hydrogenated may be introduced at one or several points along the reaction vessels.

It is of advantage that the constituents of the feed charge be free from impurities. It is thus possible to use any treatment for purifying the feed charge: distillation, passage through adsorbing column (alumina, adsorbing earth and the like), or any other means.

The following examples are given for illustrative purposes only:

EXAMPLE I

A given amount of dry cobalt bromide dissolved in a few ccms. of dry tetrahydrofuran is introduced into a hydrogenation vessel (see the following table). The residual gases are removed and there is successively introduced, under hydrogen atmosphere, benzene, cyclopentene and the stoichiometrical amount of $LiAlH(O\text{-tert.Bu})_3$ in tetrahydrofuran, i.e. a molar ratio of the cobalt salt to the aluminum compound of 1/4. The following table shows the velocities obtained at 20° C. under 92 cm. Hg. The velocities are expressed by the number of moles of $H_2$ absorbed per minute and per liter of solution. The conversion to cyclopentane is complete.

| Concentration of— | | Velocity in moles of $H_2$ per liter and per minute |
|---|---|---|
| $CoBr_2$ in millimoles per liter | Cyclopentene in moles per liter | |
| 3.13 | 1.25 | 0.440 |
| 2.82 | 1.13 | 0.426 |
| 1.45 | 1.16 | 0.354 |
| 0.73 | 1.18 | 0.272 |
| 0.297 | 1.19 | 0.099 |

The table shows that with 0.73 m.mole per liter, i.e. about 43 mg. of cobalt per liter, it is possible to hydrogenate in 4 minutes about one mole of olefin at 20° C. under 92 cm. Hg.

EXAMPLE II

The following table gives the velocities of hydrogenation of cyclopentene obtained with use, as electron-donors, of various phosphine oxides. In the first two examples, the reducing agent is $AlH(O\text{-tert.Bu})_2$; (the molar ratio of the cobalt salt to the reducing agent is 1/2).

In the last three examples, the reducing agent is $LiAlH(O\text{-tert.Bu})_3$; the molar ratio of the cobalt salt to the reducing agent is 1/4. These hydrogenations have been carried out in benzene under a pressure of 92 cm. The concentrations of cobalt bromide are 1 m.mole per liter.

| Complex | Cyclopentene concentration, moles/liter | Reaction temperature, °C. | Velocity (moles/min./liter) |
|---|---|---|---|
| $CoBr_2[PO(naphthyl)_3]_2$ | 1.52 | 29 | 0.026 |
| $CoBr_2[PO(phenyl)_3]_2$ | 1.07 | 22 | 0.077 |
| $CoBr_2[PO(isobutyl)_3]_2$ | 1.08 | 29 | 0.033 |
| $CoBr_2[PO(octyl)_3]_2$ | 2.54 | 23 | 0.029 |
| $NiBr_2[PO(octyl)_3]_2$ | 2.69 | 23 | 0.0298 |

EXAMPLES III TO XI

Hydrogenation of 1-hexene with titanium catalysts:

| Complex | A | Reducing agents | B | C | Temperature, °C. | Velocity, moles⁻¹ mn.⁻¹ |
|---|---|---|---|---|---|---|
| $Ti(OPh)_2Cp_2$ | 1.17 | $LiAlH_2(OPh)_2$ | 3 | 1.88 | 20 | 1.97 |
| $Ti(OPh)_2Cp_2$ | 0.76 | $LiAlH_2(Ot\text{-}C_4H_9)_2$ | 4 | 1.25 | 20 | 2.22 |
| $Ti(OPh)_2Cp_2$ | 1.11 | $LiAlH_2(Ot\text{-}C_4H_9)_2$ | 4 | 1.78 | 20 | 3.03 |
| $Ti(OPh)ClCp_2$ | 0.68 | $LiAlH_2(Ot\text{-}C_4H_9)_2$ | 4 | 1.10 | 20 | 2.32 |
| $TiCl_2Cp_2$ | 6.31 | $LiAlH_2(Ot\text{-}C_4H_9)_2$ | 2.5 | 1.33 | 20 | 0.895 |
| $Ti(SPh)_2Cp_2$ | 2.50 | $LiAlH_2(Ot\text{-}C_4H_9)_2$ | 4 | 0.84 | 20 | 0.270 |
| $Ti(OPh)_2Cp_2$ a | 2.13 | $LiAlH_2(Ot\text{-}C_4H_9)_2$ | 3 | 1.70 | −25 | 1.79 |
| $TiCl_2Cp_2$ b | 0.91 | $LiAlH(Ot\text{-}C_4H_9)_3+AlH_3$ | 30/15/1 | 0.73 | 20 | 0.485 |
| $TiCl_2Cp_2$ | 2.85 | $LiAlH_2(Ot\text{-}C_4H_9)_2$ | 4 | 1.14 | 20 | 0.396 | a With cyclopentene instead of 1-hexene.
b The catalyst was previously reduced, evaporated to dry at 80° C., and melted in paraffin.

NOTE.—Cp=Cyclopentadiene; Ph=phenyl; A= Concentration of Ti$_{IV}$ complex in millimoles per liter; t-C$_4$H$_9$=Tertiary butyl; B=Molar ratio of reducing agent to titanium compound, C=Concentration of olefin in moles per liter.

The experiments are carried out by injecting successively into a solution, the solvent (heptane), the reducing agent, the olefin and the titanium compound dissolved in a small amount of benzene.

The manufacture is carried out under $H_2$ or an inert gas free from oxygen. When the violet or brown colour appears, according to the case, the mixture is stirred up and the hydrogen absorption is measured.

The velocity is given by the number of moles of $H_2$ absorbed per minute and per liter of solution containing 0.9 to 3 millimoles of titanium compound and 1 to 2 moles of olefin.

The conversion to cyclopentane or hexane is always complete.

In some cases the velocities are higher than those obtained with cobalt and are definitely higher than those obtained with conventional techniques.

EXAMPLE XII 0.2 mmole of $FeCl_3$ (10 mg. of iron) dissolved in a small amount of tetrahydrofuran, 5 cc. of cyclopentene (57 mmoles) and 15 cc. of benzene are introduced in a reaction vessel 0.88 mmole of $LiAlH_2(OR)_2$ wherein R is tert.$C_4H_9$ are introduced thereafter. The hydrogenation velocity is 94 cc./mn. i.e. 142 mmoles·l.⁻¹·mn.⁻¹ for a $FeCl_3$ concentration of 7.27 mmoles·l.⁻¹ at 27° C. and, under one atmosphere of $H_2$. When the hydrogenation is complete, isoprene (2 cc.) is injected, which is completely hydrogenated at a velocity of 86 cc./mn. i.e. 122 mmoles·l.⁻¹·mn.⁻¹.

EXAMPLE XIII

Chromium chloride is admixed with $PO(C_8H_{17})_3$ to be made soluble in benzene· 0.4 mmole of the formed complex is introduced in a hydrogenation reactor and cyclopentene (5 cc.), benzene and the reducing agent, i.e. 1.6 mmole of $LiAlH_2(OR)_2$ in which R=tert.$C_4H_9$ are successively injected. The obtained velocity is 25 cc./mn. at 20° C., i.e., 40 mmoles·l.⁻¹·mm.⁻¹.

EXAMPLES XIV TO XX

These examples illustrates the use of a cobalt salt with various reducing agents.

The following table shows the use of various reducing agents in the hydrogenation of cyclopentene at 20° C./92 cm. Hg. The solutions contained from 0 to 85% of tetrahydrofuran:

| Reducing agents | B | A | Reducing agent/cobalt salt (molar ratio) | Velocity, moles l.⁻¹mn.⁻¹ |
|---|---|---|---|---|
| Li Al H(OMe)$_3$ | 1 | 0.6 | 4 | 0.109 |
| Al H (OR)$_2$ | 2.54 | 4.5 | >10 | 0.133 |
| Li Al H(OR)$_3$ | 0.99 | 0.24 | 15 | 0.314 |
| Li Al H$_2$(OR)$_2$ | 1.12 | 0.48 | 5 | 0.081 |
| Al H$_2$ (OR) | 1.18 | 2.94 | 3 | 0.180 |
| Al H(N(Bu)(Bu))$_2$ | 0.93 | 2.32 | >10 | 0.090 |
| Na Al H(OR)$_3$ | 1.13 | 0.57 | >20 | 0.515 |

NOTE:
A=Concentration of the cobalt salt (millimoles per liter).
B=Concentration of olefine (moles per liter).
R=tert. C$_4$H$_9$; Me=Methyl.
The cobalt salt was CoBr$_2$ PO (C$_8$H$_{17}$)$_3$ $_2$.

The velocities are expressed by the moles of hydrogen absorbed per liter and per minute.

In all cases the conversion to cyclopentane was quantitative.

EXAMPLES XXI TO XXIV

Various cobalt salts may be used for the hydrogenation. $t$=20° C.; $p$=92 cm. Hg. The reducing agent is $LiAlH(OR)_3$, in which R is tert-butyl, used in excess;

L is $PO(C_8H_{17})_3$. The velocities are expressed as $moles \cdot l.^{-1} \cdot mn.^{-1}$. The results are given hereafter:

| Complexes | Reducing agent cobalt salt (molar-ratio) A | B | Velocity, $M.l.^{-1} mn.^{-1}$ | Conversion, percent |
|---|---|---|---|---|
| Co(acetylacetonate)$_2$ | 0.45 | 25 | 0.9 | 0.2 | 100 |
| CoBrL$_2$ | 0.23 | 50 | 0.92 | 0.46 | 100 |
| CoBr$_2$ | 0.23 | 50 | 0.93 | 0.358 | 100 |
| Co$_{II}$ acetate plus 6 L | 0.47 | 15 | 0.945 | 0.337 | 100 |

NOTE:
A = Concentration of cobalt II in mmoles, $l.^{-1}$.
B = Concentration of cyclopentene in moles, $l.^{-1}$.

EXAMPLE XXV 150 ml. of cyclododecatriene are introduced in a reaction vessel from which air has been blown off and thereafter heated up to 80° C. Hydrogen is thereafter added under a pressure of 30 atmospheres, and then 0.3 millimole of $LiAlH(OR)_3$, where R is tert. butyl, dissolved in 1 ccm. of tetrahydrofuran, and finally 0.05 m.mole of cobalt naphthenate. The reaction is complete after 1 hour and a half during which the stoichiometrical amount of hydrogen is absorbed. After cooling, cyclododecane is withdrawn in the form of a crystalline white powder. The bromine number shows that not even one part of olefin per thousand parts remains. The content of cobalt of the obtained cyclododecane is only 22 p.p.m. The remaining tetrahydrofuran may be removed by a further physical treatment.

EXAMPLE XXVI

Example XXV is repeated, except that cyclododecatriene is dissolved in heptane. The reaction is conducted at 50° C. for one hour. The obtained solution of cyclododecane in heptane has a bromine number of zero.

EXAMPLE XXVII

Example XXV is repeated, except that the reducing agent is $NaAlH(OR)_3$ in which R is tert. butyl. Comparable results are obtained.

EXAMPLE XXVIII

Example XXV is repeated, excepted that a previously reduced solution of cobalt naphthenate in cyclododecatriene is injected in cyclododecatriene at 80° C. Once the hydrogen has been absorbed, the gases are removed, the vessel is cooled down and the thus obtained cyclododecane has become free from the solvent of the reducing agent.

EXAMPLE XXIX

Example XXV is repeated with cyclooctadiene, and cyclooctane is obtained with a quantitative yield.

EXAMPLE XXX 140 ccm. of cyclododecatriene, 0.15 millimole of $NaAlH_2(isobutyl)_2$ and finally 0.025 millimole of cobalt stearate dissolved in 5 ccm. of cyclododecatriene are introduced in a pressure vessel, in the presence of hydrogen. After heating up to 90° C., there is obtained a complete hydrogenation of cyclododecatriene to cyclododecane.

What we claim is:

1. In a process for hydrogenating an unsaturated organic compound capable of being reduced which comprises reacting the unsaturated compound with hydrogen in contact with a catalyst, the improvement wherein said catalyst is obtained by contacting a transition metal compound with an aluminum hydride of the formula:

$$Me(AlH_mX'_{4-m})_p$$

$m$ is 1, 2 or 3,
Me is a metal of Group Ia of IIa or the Periodic Table,
$p$ is the valence of the metal Me,
X' is R, OR, NR$_2$, NHR or SR,
R, taken separately, is a monovalent hydrocarbon, and when taken in pairs represent —A—Z—B— wherein A and B each is alkylene, and Z is alkylene, an oxygen or sulfur atom, a NH or N-hydrocarbyl group or a polyvalent metal.

2. A process as defined by claim 1, wherein Me is lithium, sodium or calcium.

References Cited

UNITED STATES PATENTS

| | | | |
|---|---|---|---|
| 3,110,747 | 11/1963 | Mullineaux | 260—683.9 |
| 3,308,177 | 3/1967 | Atkins | 260—666 A |
| 3,499,050 | 3/1970 | Gosser | 260—666 A |
| 3,439,054 | 4/1969 | Kroll | 260—666 |
| 3,536,632 | 10/1970 | Kroll | 252—430 |

DELBERT E. GANTZ, Primary Examiner

V. O'KEEFE, Assistant Examiner

U.S. Cl. X.R.

252—430; 260—666 A, 666 B, 667, 677 H, 683.9

UNITED STATES PATENT OFFICE
CERTIFICATE OF CORRECTION

Patent No. 3,663,635          Dated  May 16, 1972

Inventor(s) Christian Lassau, Robert Stern, and Lucien Sajus

It is certified that error appears in the above-identified patent and that said Letters Patent are hereby corrected as shown below:

Column 1, line 7, after "France" insert -- assignors to Institut Francais du Petrole, Des Carburants et Lubrifiants of 1 & 4, Avenue de Bois Preau, 92 - Rueil-Malmaison (Hauts de Seine), France -- line 49, change "or" to -- on --

Column 4, line 21, after the left bracket, change "C" to -- O -- line 22, change "$H_5$" to -- $H_9$ --

Column 9, line 10, change "$CoBrL_2$" to -- $CoBr_2L_2$ --

Signed and sealed this 13th day of February 1973.

(SEAL)
Attest

EDWARD M.FLETCHER,JR.           ROBERT GOTTSCHALK
Attesting Officer               Commissioner of Patents